United States Patent [19]

Ferre et al.

[11] Patent Number: 5,245,675
[45] Date of Patent: Sep. 14, 1993

[54] METHOD FOR THE RECOGNITION OF OBJECTS IN IMAGES AND APPLICATION THEREOF TO THE TRACKING OF OBJECTS IN SEQUENCES OF IMAGES

[75] Inventors: Alain Ferre, Cesson Sevigne; Yannick Villalon, Rennes, both of France

[73] Assignee: Thomson-CSF, Puteaux, France

[21] Appl. No.: 772,328

[22] Filed: Oct. 7, 1991

[30] Foreign Application Priority Data

Oct. 9, 1990 [FR] France .................. 90 12445

[51] Int. Cl.$^5$ .......................................... G06K 9/00
[52] U.S. Cl. ................................. 382/27; 382/30
[58] Field of Search ............... 382/27, 30, 41, 15

[56] References Cited

U.S. PATENT DOCUMENTS 5,101,441 3/1992 Yamaguchi ................... 382/27

OTHER PUBLICATIONS

IEEE Pacific Rim Conference on Communications, Computers and Signal Processing, Jun. 4–5, 1987, Victoria, B. C., Canada; IEEE New York, USA, pp. 77–80; Zhi-Qiang Liu, et al.; "Image Detection by Singular Value Decomposition of Image Matrices".
IEEE Transactions on Pattern Analysis and Machine Intelligence; vol. PAMI7, No. 3, May, 1985; New York, USA; pp. 338–344; Ardeshir Goshtasby; "Template Matching in Rotating Images".

Primary Examiner—Michael T. Razavi
Assistant Examiner—Yon J. Conso
Attorney, Agent, or Firm—Oblon, Spivak, McClelland, Maier & Neustadt

[57] ABSTRACT

The disclosed method comprises a learning phase, during which the object zone to be recognized, selected in a learning image, is modelized, and a recognition phase during which the modelized zone is compared with image zones of a same size taken taken from the images to be processed. To characterize the image zones that are models of objects to be recognized or image zones to be processed, the method uses a decomposition of the matrices of the luminance values into singular values according to a matrix product of projection matrices and an ordered diagonal matrix, this ordered diagonal matrix constituting a characteristic signature of the zone considered; for the recognition phase, differences between the signature of the model zone and the signatures of the zones of the image considered are computed and image zones are selected on the basis of the least differences according to an iterative method which consists in conducting a rough sorting operation on a large number of zones in an initial stage, and then an increasingly finer sorting operation on an increasingly limited number of zones. The computations done in each step are re-used in the next step.

4 Claims, 2 Drawing Sheets

METHOD FOR THE RECOGNITION OF OBJECTS IN IMAGES AND APPLICATION THEREOF TO THE TRACKING OF OBJECTS IN SEQUENCES OF IMAGES

BACKGROUND OF THE INVENTION

1. Field of the Invention

The invention relates to the field of image processing and, more particularly, an object of the invention is a method for the recognition of shapes in images and its application to the tracking of objects in sequences of images.

2. Description of the Prior Art

Presently known methods used to recognize objects in images use binary correlation or multilevel correlation in the spatial domain or in a transformed domain, or methods of comparison using shape descriptors.

The recognition of objects in an image generally relies on a search, in the image, for the patterns that most resemble known models.

The model of recognition of an object may take different forms but always characterizes a precise representation of the characteristics of the object to be recognized. It may be a matrix of dots, a collection of geometric elements, a set of contours or, again, an analysis in a particular field (Fourier transform, Hadamard transform wavelets etc.).

These methods are mostly very costly in terms of computation time in cases where they are required to be very reliable and robust.

SUMMARY OF THE INVENTION

An object of the invention is a method, and the corresponding device, for the recognition of shapes, wherein the reliability and robustness of the results are obtained without any excessive cost in terms of computation time. To this end, the method uses, for this recognition, a decomposition into singular values of the image (or S.V.D. for singular value decomposition).

The singular value decomposition of an object represented by a matrix of dots characterizes this object by its "signature" on a projection space defined by two projectors. This signature, constituted by the singular values of the object matrix, defines the recognition model. An object is then defined by three matrices referenced U, V and S. The matrix S is an ordered diagonal matrix. All the values of the diagonal correspond to the signature of the object. The matrices U and V are the matrices of the projection.

An object is recognized if its signature, after projection, is close to the signature sought. For, there is an almost univocal relationship between the signature and the zone to which it corresponds.

According to the invention, the recognition is done according to an iterative method on the eigen values.

In the first step of the method, a first sorting operation is carried out on all the possible zones, in using only one first eigen value.

At the ith step, a sorting will be done from among the zones selected at the previous step on a greater number of eigen values.

The method therefore consists, initially, in carrying out a rough sorting operation on a large number of zones, and then in carrying out an increasingly fine sorting operation on an increasingly limited number of zones. The computations done in each step are re-used in the following step.

A first object of the invention is a method for the recognition of objects in images comprising:
  a learning phase during which the object zone to be recognized, selected in a learning image, is modelized, and
  a recognition phase during which the modelized zone is compared with image zones of a same size, taken from the images to be processed,
wherein, for the characterization of the image zones that are models of objects to be recognized or of the image zones to be processed, said method uses a decomposition of the matrices of luminance values into singular values according to a matrix product of projection matrices and an ordered diagonal matrix, said ordered diagonal matrix constituting a characteristic signature of the zone considered, and wherein, for the recognition phase, differences between the signature of the model zone and the signatures of the zones of the image considered are computed and image zones are selected on the basis of the least differences according to an iterative method such that:
  in a first step, only the first coefficient of the ordered signature matrices is considered for the computation of the differences, but this is done for all the image zones possible;
  then, in a second step, the $p_2$ first coefficients of the signature matrices, $p_2$ being greater than 1, are considered for a reduced set of $n_1$ image zones selected in the previous step as image zones exhibiting the least differences;
  in an ith step, a number $p_i$, greater than $p_{i-1}$, of matrix coefficients is considered for a reduced set of $n_1$ image zones selected in the step (i-1) because they exhibit the smallest differences, with i varying from 3 to $k-1$.
  in a kth and last step, all the coefficients of the signature matrices of the image zones selected in the second last step are considered to select the image zone having the smallest difference in signature with respect to the model zone.

A second object of the invention lies in the application of the method to the tracking of objects in sequences of images.

BRIEF DESCRIPTION OF THE DRAWINGS

The invention will be understood more clearly and other features will appear from the following description, made with reference to the appended figures.

DESCRIPTION OF THE PREFERRED EMBODIMENT

Figure 1:
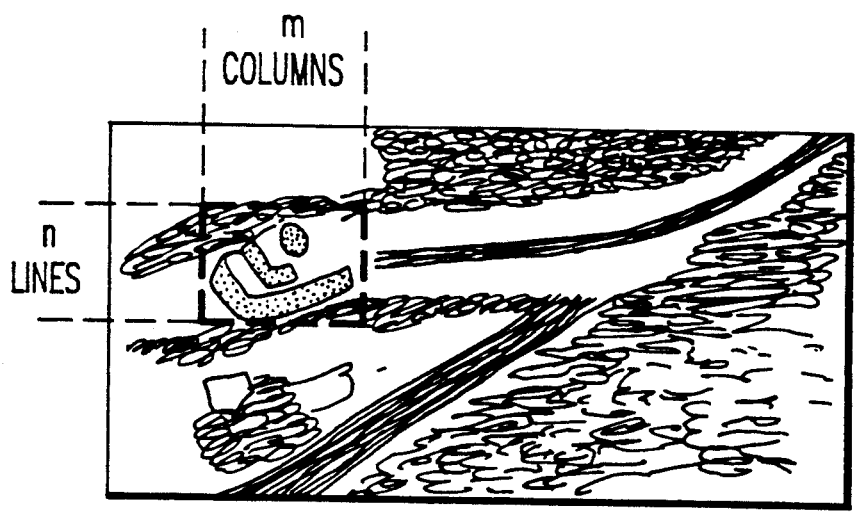
FIGS. 1 and 2 respectively illustrate an image in which there is selected a zone comprising an object to be recognized and a second image in which this object should be recovered.
Figure 2:

Singular values decomposition is a promising method in the field of image processing for applications of shape compression, filtering and recognition.

As indicated briefly here above, transformation by singular value decomposition consists in analyzing an image (or part of an image), in which the luminance values of the points form a matrix A with a size (m, n)

that is rectangular or square, into a matrix product defined by:

[A]=[U] [S] [V]$^t$, where [V]$^t$ is the transposed matrix of [V] and where the matrix S is an ordered diagonal matrix such that:

[S]=diag($s_1,s_2,s_3,s_4,\ldots s_p$)

with p=min(m,n).

These diagonal elements $s_1\ldots s_p$ are singular values of the matrix A and are positive real numbers (positive square roots of the eigen values) classified in descending order:

$s_1 > s_2 > s_2 > \ldots > s_p$.

The matrices [U] and [V], with respective sizes of (m,p) and (p,n) group together the left-hand singular values (U) and right-hand singular values (V) of A in their columns. The columns $u_i$ of [U] are the eigen vectors of $[A]^t \cdot [A]$.

[U]=[$u_1, u_2 \ldots u_p$]; $u_i$ is a column vector with a size m
[V]=[$v_1, v_2 \ldots v_n$]; $v_i$ is a column vector with a size p These matrices have the following particular features:

$[U]^t[U] = [V] \cdot [V]^t = I_p$ where $I_p$ is the identity matrix with a dimension (p,p).

The diagonal matrix [S] is such that:

[S]=diag ($s_1, s_2, 2_3, \ldots s_r, \ldots s_p$)

with $s_1 > s_2 \ldots s_r > 0; s_{r+1} = \ldots = s_p = 0$ where r is the rank of the matrix A. The eigen vectors and the singular values are defined by the following relationships:

$A \cdot v_i = s_i \cdot u_i$ $A^t u_i = s_i \cdot v_i$

The transformation by singular value decomposition can therefore be represented in the following form:

$$A = \sum_{i=1,p} (s_i u_i v_i^t)$$

Several methods have been developed to determine the matrices [U], [V], [S].

Singular value decomposition is computed by applying the Golub/Reinsch algorithm relating to the Golub/Kahan method which is a standard one in matrix processing operations.

This method consists, firstly, in transforming the matrix [A] into a bidiagonal matrix by the HOUSEHOLDER method and then, on the basis of this bidiagonal shape, in computing the singular values. This method is efficient, fast and convergent. However, it is difficult to adapt it to multiprocessor computation.

Another type of method, called the SVD power algorithm, is being currently developed. This method uses an iterative method:

$su = [A]_i V$ and $sv = [A]^t u$ if k is the preceding iteration rank:

$u^{(k+1)} = [A]v(k)/||[A]v^{(k)}||$ $v^{(k+1)} = [A]U(k+1)+1)/||[A]^t u^{(k+1)}||$

The iterative method is continued until the instant when:

$||u^{(k+1)} - u^{(k)}||$ is smaller than a fixed value. The first singular value is then equal to:

$s_1 = ||[A]^t u^{(k+1)}||$,

The vectors $u_1$ and $v_1$ are given respectively by the vectors $u^{k+1}$ and $v^{k+1}$ respectively coming from the last iteration.

To obtain the following pair of vectors ($u_2, v_2$), the method is reiterated in considering no longer the matrix A bu the matrix A' defined by:

$[A]' = [A] - s_1 u_1 v_1^t$

This type of algorithm may give rise to problems of convergence and stability. However, it is well suited to applications that us only the first singular values.

Finally, another category of algorithm is based on the Hestenes/Nash method known as "one side transformation" which enables searching for the singular values of a matrix through the application of sequences of plane rotations to the columns or lines. This method enables only a complete decomposition of the image and is especially suited to small-sized matrices.

The computation time needed to carry out this decomposition, irrespectively of the method adopted, represents only a minute part of the computation time which will be used for the recognition of the pattern in an image. Furthermore, the learning process is not subjected to the time constraints dictated during the recognition stage.

The choice of the decomposition method is therefore not of critical importance, and either of the above described methods may be used, since the optimization is indispensable above all at the level of the recognition method proper.

The algorithm used to compute the different matrices depends on the type of computer (parallel, series etc.) that will be used to compute the singular value decomposition, and is not described in detail in the present description since it is within the scope of those skilled in the art.

In using a decomposition such as this, the energy of the image is concentrated on the first coefficients ($s_1, S_2, \ldots$). The last coefficients ($\ldots s_{p-1}, s_p$) correspond to the details and to the noise contained in the image.

This property is used for applications to the recognition of shapes in the image. The recognition is obtained by considering the set [S] to be the signature of the model to be recognized. The shape recognition is then obtained in two stages.

The first stage consists in carrying out a learning operation on the model to be recognized, defined by a rectangular (or square) matrix of the luminance values that most closely surround the object to the characterized. The learning operation consists in computing the three matrices [U], [V], [S] that define this model completely and uniquely.

The second stage consists in making a search, in an image to be processed, of that part of an image which corresponds best to the model.

This search stage is conducted by seeking to recognize the object A in the image M by means of its signature [S]. To this end, the signatures [S$_{lc}$] of each of the image zones M$_{lc}$ that form the image M are computed and then compared with the signature S of the object to be recognized.

Figure 3:
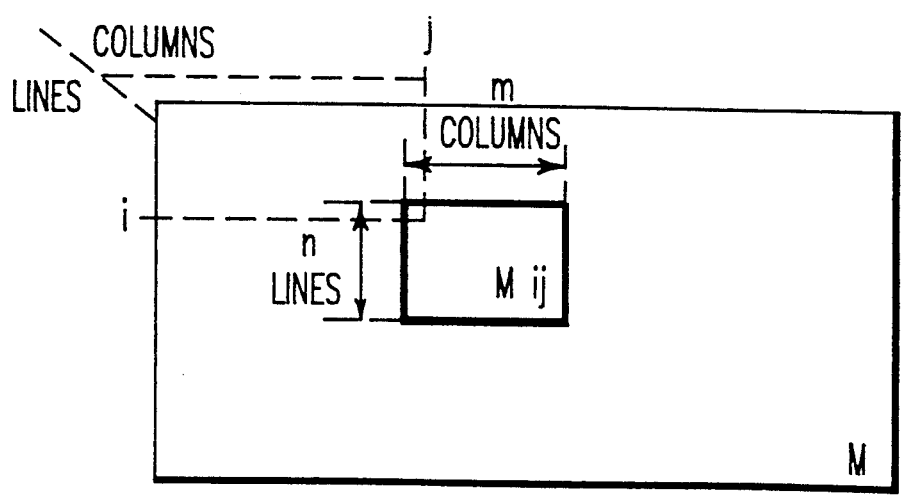
FIG. 3 is an explanatory diagram.
Figure 4:
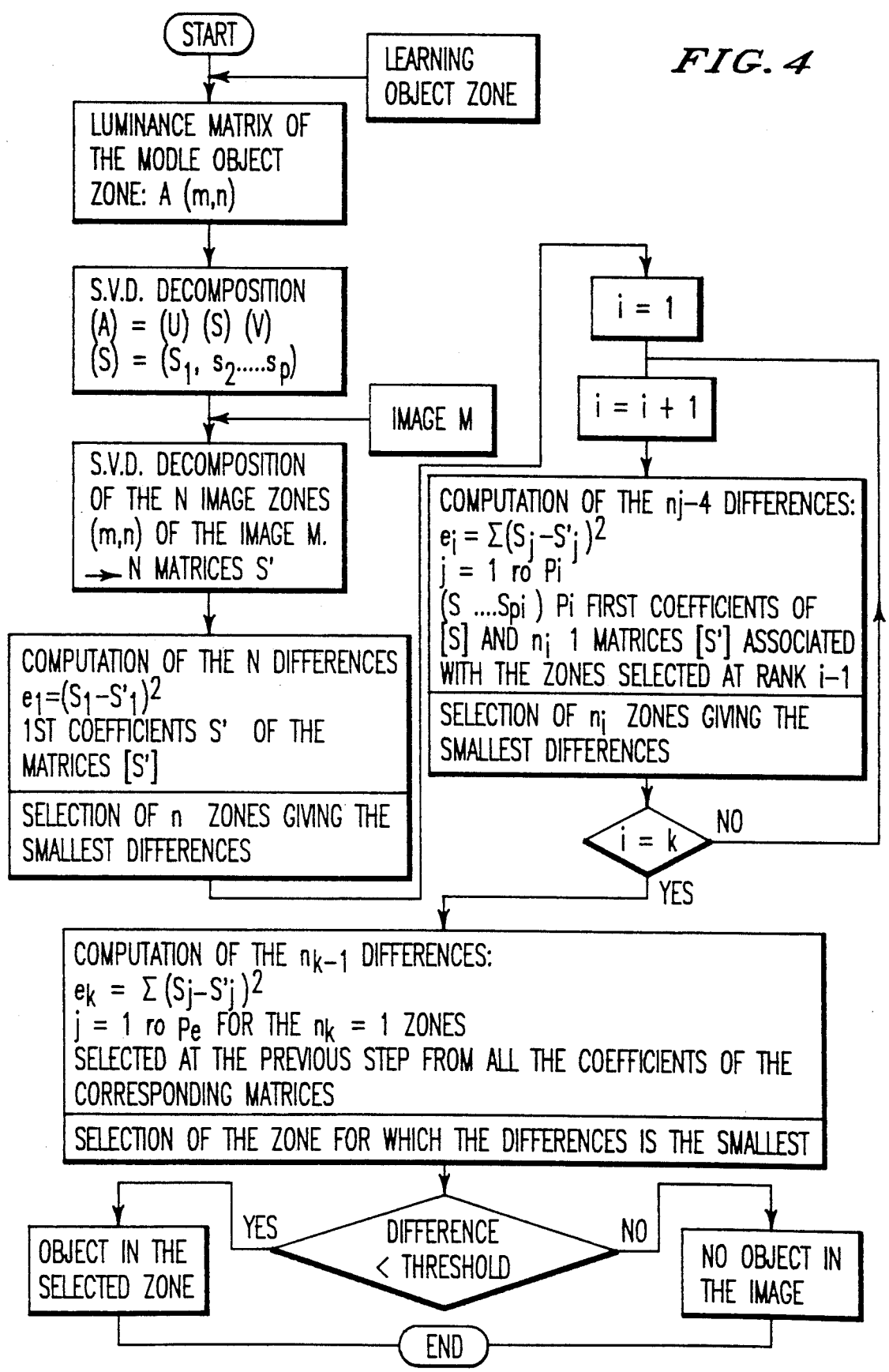
FIG. 4 illustrates the recognition method according to the invention.

An image zone M$_{lc}$ as illustrated in FIG. 3 is a matrix A' with a size (m,n) equal to that of the object matrix A, extracted from the image at the position (l,c). The corresponding signature [S$_{lc}$] is computed in the same way as that of the matrix A.

The comparison between the two signatures, [S] and S$_{lc}$], which should enable an appreciation of the resemblance, is done by computing the difference or distance between the two matrices [S] and [S$_{lc}$]. This difference is equal to:

$$e = |S - S_{1c}|^2 = \sum_{i=1ap} |s_i - s'_i|^2$$

with $$[S_{lc}] = diag(s'_2, \ldots s'_2 \ldots s'_p)$$

This difference e measures the similarity of the signatures of the model and of the image zone examined.

The search for the pattern in the image could theoretically be done by considering all the zones with a size m x n of the image by shifts and by making a computation, for each of these zones, of a signature and the difference between this signature and the signature of the object. The position of the pattern is then the position of the image zone from which the smallest difference e has been computed.

This search, done on the entire image, in taking account all the eigen values, entails an operation which, given the computations to be performed, is hardly realistic and this approach cannot be used to resolve the problem which is one of optimizing the ratio between computation time and reliability and robustness of the method. There is therefore provision, according to the invention, to limit the number of computations. A first possibility would be to limit the number of eigen values. This is a delicate operation, for the number of eigen values to be preserved depends on the characteristics of the objects to be sorted out: if two objects are close together, then a large number of eigen values needs to be considered in order to differentiate them whereas, if these objects are very different, a limited number of eigen values would be enough.

To limit the number of computations, a so-called "top down" iterative method has been used. This method consists in making a selection, at each step, of a set of candidate image zones, according to an increasing resolution and on a search field of decreasing size:

the first step selects a number n$_1$ of zones according to the descending-order values of the difference e computed from a single eigen value, for all the zones of the image.

The difference for each zone is computed as follows:

$$e = (s_1 - s'_1)^2$$

where:

$$s'_1 = \sum_{k=1,m} \left[ U(k,1) \sum_{r=1,m} A'(k,r) \cdot V(r,1) \right]$$

The n$_1$ positions of the zones leading to the smallest differences are kept and will be used in the next step.

the second step entails a sorting, from among these n$_1$ image zones, of a number n$_2$ of image zones according to the descending-order values of the differences computed, in considering p$_2$ eigen values. The difference is written as:

$$e = \sum_{i=1ap_2} (s_i - s'_i)^2$$

where:

$$s'_i = \sum_{k=1,m} \left[ U(k,i) \sum_{r=1,n} A'(k,r) \cdot V(r,i) \right]$$

At the ith step, n$_i$ zones are chosen, again according to a sorting criterion based on the descending-order values of differences, from among the n$_{i-1}$ candidate zones chosen at the previous step, i−1, the difference being computed according to P$_i$ eigen values.

The last selection step enables the selection of the image zone leading to the minimum difference from all the eigen values of the matrices corresponding to the zones chosen in the previous step. The number of zones and of eigen values chosen for the computations in the different steps are therefore such that:

n$_1$ > n$_2$ > n$_3$ > ... > 1 (number of image zones)

1 < p$_2$ < p$_3$ < ... < p$_t$ (number of eigen values)

where p$_t$ represents the total number of eigen values.

A final step consists in effecting a comparison between the signature of the object zone and the signature of the image zone chosen in the last step of the iterative method, the chosen image zone leading to the recognition of the object only if the signatures are close enough, the corresponding difference being, for example, smaller than a predetermined fixed threshold.

In one embodiment, a number of iterations equal to 0 has been used (irrespectively of the size of the learning object).

Two constraints have been introduced:

1. For the first five iterations, the number of eigen values used corresponds to the rank of the iteration (1st iteration, 1 eigen value; 2nd iteration, eigen values; ... 5th iteration, 5 eigen values). The size of the object to be searched for is assumed to be greater than 10 × 10 pixels.

2. In the last step, all the eigen values are considered.

The first iteration therefore consists in a rough and fast selection of image zones liable to meet the characteristics of the object zone used for the learning, and the successive iterations enable an increasingly finer selection of the possible image zones, until the final step when only one zone is selected.

For each iteration with a rank greater than 5, the number of eigen values taken into account has been computed according to the formula:

$$p_i Ent\ [a*(exp(k*i)-1)]$$

where Ent signifies an integer part of the expression within square brackets, and $$a = 25/(p_t - 100)$$

and $$k = 1/5 * log(p_+/5 - 1)$$

where $p_t$ corresponds to the maximum number of eigen values;

with the above constraints $P_5 = 5$ and $P_{10} = pt$.

Improvements are useful, notably if the object to be recognized has undergone a uniform variation in luminance from the model to the processed image. The object to be sought in the image may indeed have undergone a variation in luminance due to a different illumination (visible imaging) or to a temperature modification (infrared imaging).

In this case, the method as defined here above does not enable the recover of the object in the image. It is then necessary to introduce the following improvement:

An image zone A is considered to be formed by two components:

an information component Al represented by a matrix with a size m × n;

a luminance variation component AL also represented by a matrix with a size m × n. These two matrices are such that:

$$A = Al + AL$$

and $$Al = k \times II$$

where II is a matrix with a dimension n x m constituted by ones and where the coefficient k represents the difference in mean luminance between the candidate image zone and the learning object zone.

The sequence of the stages of the recognition method is identical to that described here above, except for the following modification:

The contribution of the luminance variation is removed from the matrix S' to give the reduced matrix:

$$SR' = S' - k \cdot Ut * II * V$$

where the coefficients of the diagonal matrix SR' are such that:

$$sr'_i = s'_i - k\ corr\ (i,j)$$

The coefficient k should be computed for each sub-imate at the first iteration and should be preserved for the following iterations:

The value corr (i,j) is such that:

$$corr(i,j) = \sum_{r,k} u_k^t \cdot v_r$$

with k = 1, m and r = 1, n.

The elements of this matrix should be completed for each new iteration.

The difference e for each sub-image is then written as:

$$e = \Sigma(s_i - sr'_i)^2,$$

with i varying between 1 and $p_i$.

For a uniform luminance variation and a small number of cases of saturation (this excludes any case an excessive saturation and non-linear responses from the sensors), the method has been implemented in introducing an offset on the luminance values of 100 (which introduces a saturation of the order of 2% in the image).

The sensitivity of the method has been verified by adding a Gaussian noise to the luminance values: the difference increases as a function of the increase in the noise value (four eigen values have been used).

the influence of the rotation of the object in the image has also been analyzed. The computed difference changes as a function of the rotation of the sub-imate. An increase in the difference as a function of the rotation angle is observed, but the effect of the difference on the detection of an object remains small for rotation angles of 10° and 20° successively. The recognition is no longer accurate for an angel greater than or equal to 30°.

The set of eigen values represents a good signature of the object and enables reliability and robustness in the recognition of this object.

For the implementation of the method, an algorithm optimizing the computation time has therefore been defined. Each step corresponds to a resolution. The initialization is done with a rough resolution (on the first eigen values). The last step enables the selection of the object in a fine resolution (all the eigen values are considered). To this end, in short:

the first step of the method consists in performing a first sorting of the image zones on the first eigen value;

at the ith step, a sorting is done on the image zones selected in the previous step, on a greater number of eigen values;

at the last step, only one image zone is chosen, in considering all the eigen values for the image zones of the previous step.

This method can be used, for example, in an application to the tracking and identification, in a fixed sequence of images, of the signature of the tracked object which has to be regularly refreshed in order to take account of the modifications of shapes due to the observation at different angles and maskings often seen in applications of this type.

This method is naturally implemented by means of appropriately programmed computer processing and calculating means which, on the basis of the luminance values of the pixels of the images, enable the selection, in a reference image, of an image zone corresponding to the object to be detected, the processing of this object zone in order to determine therefrom the signature as defined here above, and then the processing of the images in which the object is searched for, according to the above-described iterative method.

What is claimed is:

1. In a pattern matching image processing method wherein a matching zone in an image to be read is matched with a template image, is searched and determined, comprising the steps of:

selecting, in a preliminary learning phase, an object zone to be recognized in a learning image;

modelizing, in a recognition phase, said modelized zone in a new image to be processed by considering several image zones of an identical size as said modelized zone, taken from said new image, by decomposing matrices of luminance values of said modelized zone and of each of said image zones into singular values according to a matrices product of a projection matrix and an order diagonal matrix which comprises a characteristic signature of each zone under consideration, and by computing differences between the signature of said model zone and the signature of each image zone according to an iterative method comprising the following steps:

in a first step, computing said differences by using only the first coefficient of the order diagonal matrices, and selecting a set of $n_i$ image zones exhibiting the least differences;

in a second step, computing said differences by using a set of $p_2$ coefficients of the order diagonal matrices relative to said modelized zone and to said set of $n_1$ image zones, for $p_2$ greater than 1, and selecting a set of $n_2$ image zones exhibiting the least differences;

in an $i^{th}$ step, computing said differences by using a set of $p_i$ coefficients of the order diagonal matrices relative to said modelized zone and to a set of $n_{i-1}$ image zones selected in the step $(i-1)$, with $p_i$ greater than $p_{i+1}$, and selecting a set of $n_i$ image zones exhibiting the smallest differences, with i varying from 3 to $K-1$ in a $K^{th}$ step, computing said differences by using all the coefficients of the order diagonal matrices, and selecting a last image zone exhibiting the smallest difference;

a final step of comparison between the signatures according to which the object of the model zone is recognized in the sub-image selected at the end of the recognition phase only if its signature is close to the signature of the model zone, the difference between their respective signatures being below a predetermined threshold.

2. A method according to claim 1, wherein $(s_1, \ldots s'_p)$ are set as coefficients of the ordered signature matrix of an image zone under consideration wherein said difference is computed at the first step and is defined as $(s_1-s'_1)$ and at a step j subsequent to said ith step, the difference computed is set equal to $$\Sigma(s_i - s'_i)^2,$$

i=1 to $p_j$ where j is the rank of the step of the iterative method and $p_j$ is the number of eigen values used at said step.

3. A method according to claim 1 or 2, wherein the iterative method is such that, for the first steps, the number of coefficients of the signature matrices used for the computation of differences is equal to the iteration rank and wherein, for the following steps, the number of coefficients if determined so as to increase gradually up to the final value $p_t$, where $p_t$ is the maximum number of coefficients of the signature matrices.

4. A method according to claim 3 wherein, when the object to be processed undergoes luminance variations, the signature matrix of the sub-image analyzed is processed beforehand for the extraction therefrom of the variation in luminance, so that the signatures of the model zone of the object and of the analyzed sub-image are comparable.

* * * * *